United States Patent
Park et al.

(10) Patent No.: US 7,899,285 A0
(45) Date of Patent: Mar. 1, 2011

(54) LEAKY SURFACE-PLASMON MODE DIRECTIONAL COUPLER AND POLARIZATION DETECTION MODULE FOR MAGNETO-OPTICAL PICKUP HEAD USING THE SAME

(75) Inventors: Yongwoo Park, Daejeon (KR); Hyeon Bong Pyo, Daejeon (KR); Dong Woo Suh, Daejeon (KR); Yeungjoon Sohn, Daejeon (KR); Hojun Ryu, Seoul (KR); Mun Cheol Paek, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1749 days.

(21) Appl. No.: 10/794,143

(22) Filed: Mar. 4, 2004

(65) Prior Publication Data

US 2005/0063644 A1    Mar. 24, 2005

(30) Foreign Application Priority Data

Sep. 18, 2003  (KR) .................. 10-2003-0064719

(51) Int. Cl.
*G02B 6/26* (2006.01)
(52) U.S. Cl. ........................ 385/42; 385/41; 385/49
(58) Field of Classification Search .............. 385/42, 385/41, 49, 9, 11, 14, 15, 18, 39, 40, 50
See application file for complete search history.

(56) References Cited

U.S. PATENT DOCUMENTS

| | | | |
|---|---|---|---|
| 4,695,123 A | | 9/1987 | Chang et al. |
| 4,971,426 A | * | 11/1990 | Schildkraut et al. .......... 359/247 |
| 5,729,641 A | * | 3/1998 | Chandonnet et al. ............. 385/2 |
| 2002/0085203 A1* | | 7/2002 | Naya ............................. 356/445 |
| 2004/0001394 A1* | | 1/2004 | Challener et al. .......... 369/13.32 |
| 2005/0041950 A1* | | 2/2005 | Rottmayer et al. ........... 385/147 |
| 2005/0063438 A1* | | 3/2005 | Capasso et al. ................. 372/45 |

OTHER PUBLICATIONS

Johnstone et al., Fibre-Optic Polarisers And Polarising Couplers, Electronics Letters, 7th Jul. 1988, vol. 24, No. 14.
Shogo Ura, et al., Focusing Grating Couplers for Polarization Detection, Journal of Lightwave Tech., vol. 6, No. 6, Jun. 1988.

* cited by examiner

*Primary Examiner* — Kaveh Kianni
(74) *Attorney, Agent, or Firm* — Blakely Sokoloff Taylor & Zafman

(57) ABSTRACT

A leaky plasmon mode directional coupler and a polarization detection module for a magneto-optical pickup head, which uses the leaky plasmon mode directional coupler, are provided. The leaky plasmon mode directional coupler is manufactured by integrating a planar waveguide and a leaky plasmon mode waveguide, which share a cladding layer with each other, into one body. The polarization detection module includes the leaky plasmon mode directional coupler, a first photo diode, which is formed on the leaky plasmon mode directional coupler, and a second photo diode, which is located at an output port of the planar waveguide.

11 Claims, 8 Drawing Sheets

LEAKY SURFACE-PLASMON MODE DIRECTIONAL COUPLER AND POLARIZATION DETECTION MODULE FOR MAGNETO-OPTICAL PICKUP HEAD USING THE SAME

BACKGROUND OF THE INVENTION

This application claims the priority of Korean Patent Application No. 2003-64719, filed on Sep. 18, 2003, in the Korean Intellectual Property Office, the disclosure of which is incorporated herein in its entirety by reference.

1. Field of the Invention

The present invention relates to a technique of miniaturizing a magneto-optical storage device, and more particularly, to a planar waveguide-type polarization detection module, which is very important for realizing an integrated optical pickup head (IOPH) into a magneto-optical pickup head.

2. Description of the Related Art

A typical magneto-optical storage device reads data from a recording medium by measuring a voltage/current signal that reflects polarization rotation rate variations, which are triggered by reflections of beams focused on the recording medium according to the Kerr effect. In order to detect such polarization rotation rate variations, a polarization detection module, which includes a polarization beam splitter and a photo diode, is generally used.

FIG. 1 illustrates an example of a conventional polarization detection module for a magneto-optical storage device. Referring to FIG. 1, the polarization detection module 20 includes an object lens 11, which is located close to a disk 10, and a partial polarization beam splitter 21, which is placed between the object lens 11 and a light source 13. A half waveplate 22 and a polarization beam splitter 23 are placed over a splitting path of the partial polarization beam splitter 21. First and second photo diodes 24 and 25 are located along a beam transmission path and a beam reflection path, respectively, of the polarization beam splitter 23. The disk 10 receives a beam from the light source 13 and then reflects the beam. The partial polarization beam splitter 21 polarizes the original beam emitted from the light source 13 and reflects the beam reflected from the disk 10 to the half waveplate 22. The half waveplate 22 has a certain-directional principal axis. Light passing through the half waveplate 22 enters the polarization beam splitter 23 and then is split into a p-wave and an s-wave such that the p-wave and the s-wave enter the first and second photo diodes 24 and 25, respectively. Each of the first and second photo diodes 24 and 25 generates current, the amount of which corresponds to the amount of light input thereinto. The current generated by each of the first and second photo diodes 24 and 25 is transmitted to a driving circuit (not shown) that extracts data or processes servo error signals.

However, there is a clear limit in integrating the above-mentioned elements of the conventional polarization detection module 20 into one body because each of the elements of the conventional polarization detection module 20 has a relatively large volume. If the polarization beam splitter 23 of the polarization detection module 20 could be manufactured into a waveguide-type polarization detection module, it would be easier to integrate the elements of the polarization detection module 20 into one body.

For example, an optical pickup head for a CD/CDR/CDRW, which is manufactured by patterning a focusing grating on a planar waveguide, has been reported by S. Ura et al., in "An Integrated-Optic Disk Pickup Device" (J. Lightwave Technol. Vol. 4, pp. 913–918, 1986). FIG. 2 illustrates an example of the optical pickup head. Referring to FIG. 2, an optical pickup head 30 includes a planar waveguide 32, which is formed on a substrate 31, and a laser diode 33, a photo diode 34, a beam splitter 35, and a focusing grating 36, which are integrated into one body on the planar waveguide 32. In FIG. 2, reference numeral 37 represents a focusing grating coupler (FGC). The optical pickup head 30 detects an optical signal that indicates a difference between amounts of light reflected from a recording medium, i.e., an optical disk. Therefore, it is possible to manufacture an optical pickup head 30 with a small form factor by integrating all the necessary elements for detecting an optical signal into one body on the planar waveguide 32 with the help of the focusing grating 36.

As an application of the above-described technique of manufacturing an optical pickup head, a polarization detection module, in which a grating is carved on a planar waveguide so as to realize a magneto-optical pickup head, has been disclosed by S. Ura et al., in "Focusing Grating Couplers for Polarization Detection" (J. Lightwave Technol. Vol 6, pp. 1028–1033, 1988). FIG. 3A illustrates an example of a conventional planar waveguide-type polarization detection module. Referring to FIG. 3A, a polarization detection module 40 includes a planar waveguide 42, which is formed on a substrate 41, and a photo diode 43 and an input coupling focusing grating 44, which are integrated into one body on the planar waveguide 42. The polarization detection module 40 detects a polarization signal and a focusing/tracking error signal by coupling light input thereinto to the frequency of the input coupling focusing grating. The frequency of the input coupling focusing grating varies depending on whether a polarization mode is a transverse electric (TE) mode or a transverse magnetic (TM) mode. In FIG. 3A, reference numeral 45 represents a focusing grating coupler.

Only when it is possible to monolithically integrate all necessary elements of a magneto-optical pickup head into one body, it is possible to manufacture the magneto-optical pickup head in large quantities and reduce the manufacturing costs. However, it is impossible to monolithically integrate the polarization detection module 40 of FIG. 3A and a focusing waveguide grating coupler into one body. Therefore, in order to realize a magneto-optical pickup head using the polarization detection module 40, the polarization detection module 40 should be aligned in such a manner that the polarization detection module 40 and the optical pickup head 30 of FIG. 2 overlap each other, as shown in FIG. 3B. However, it is very difficult to make the polarization detection module 40 and the optical pickup head 30 overlap each other.

The polarization detection module 40 of FIG. 3A couples a beam to the planar waveguide 42 using the input coupling focusing grating 44 having a predetermined frequency, and thus it generally has a very low coupling efficiency. Moreover, if the polarization detection module 40 and the optical pickup head 30 are integrated so that they overlap each other, as shown in FIG. 3B, the amount of light focused on a magneto-optical disk 51 may be undesirably small because of the higher-order refraction effect.

SUMMARY OF THE INVENTION

The present invention provides a coupler, which can effectively couple or split polarized beams without using a grating.

The present invention also provides a polarization detection module, which can be monolithically integrated into one body with a planar waveguide without causing the amount of light focused on a magneto-optical disk to decrease.

According to an aspect of the present invention, there is provided a planar waveguide-type leaky plasmon mode directional coupler, which includes a planar waveguide and a leaky plasmon mode waveguide. The planar waveguide comprises a substrate, a core layer, and a cladding layer that are sequentially stacked, the planar waveguide propagating a TM mode and a TE mode between an input port and an output port. The leaky plasmon mode waveguide comprises a lower cladding layer, a metal film, which is stacked on the lower cladding layer and generates a leaky plasmon mode, and an upper cladding layer. The lower cladding layer is the cladding layer of the planar waveguide.

According to another aspect of the present invention, there is provided a polarization detection module, which includes a planar waveguide, a leaky plasmon mode waveguide, a first photo diode, and a second photo diode. The planar waveguide comprises a substrate, a core layer, and a cladding layer that are sequentially stacked, the planar waveguide propagating a TM mode and a TE mode between an input port and an output port. The leaky plasmon mode waveguide comprises a lower cladding layer, a metal film, which is stacked on the lower cladding layer and generates a leaky plasmon mode, and an upper cladding layer, the lower cladding layer being the cladding layer of the planar waveguide. The first photo diode is located on a leaky plasmon mode directional coupler that comprises the planar waveguide and the leaky plasmon mode waveguide. The second photo diode is located at the output port of the core layer. A polarization angle is measured based on a difference between optical powers of the first and second photo diodes.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
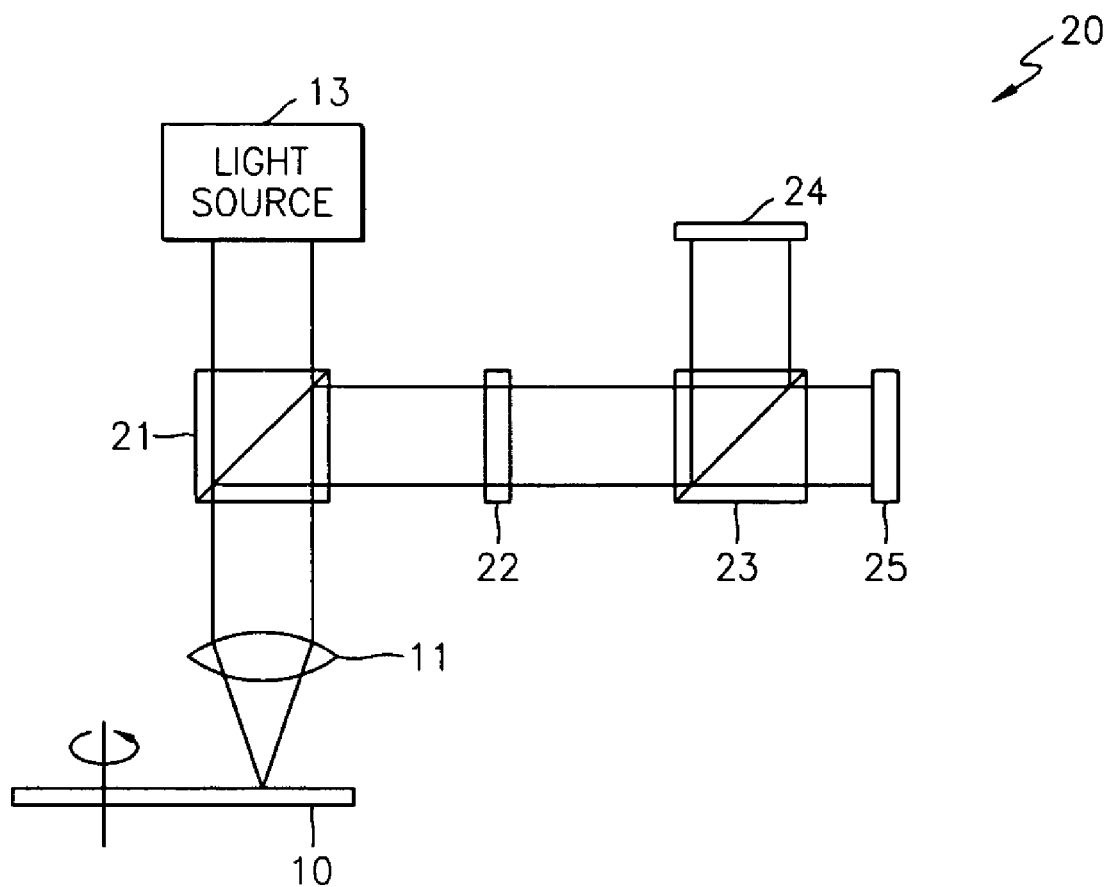
FIG. 1 is a schematic view illustrating a conventional polarization detection module for a magneto-optical storage device.
Figure 2:
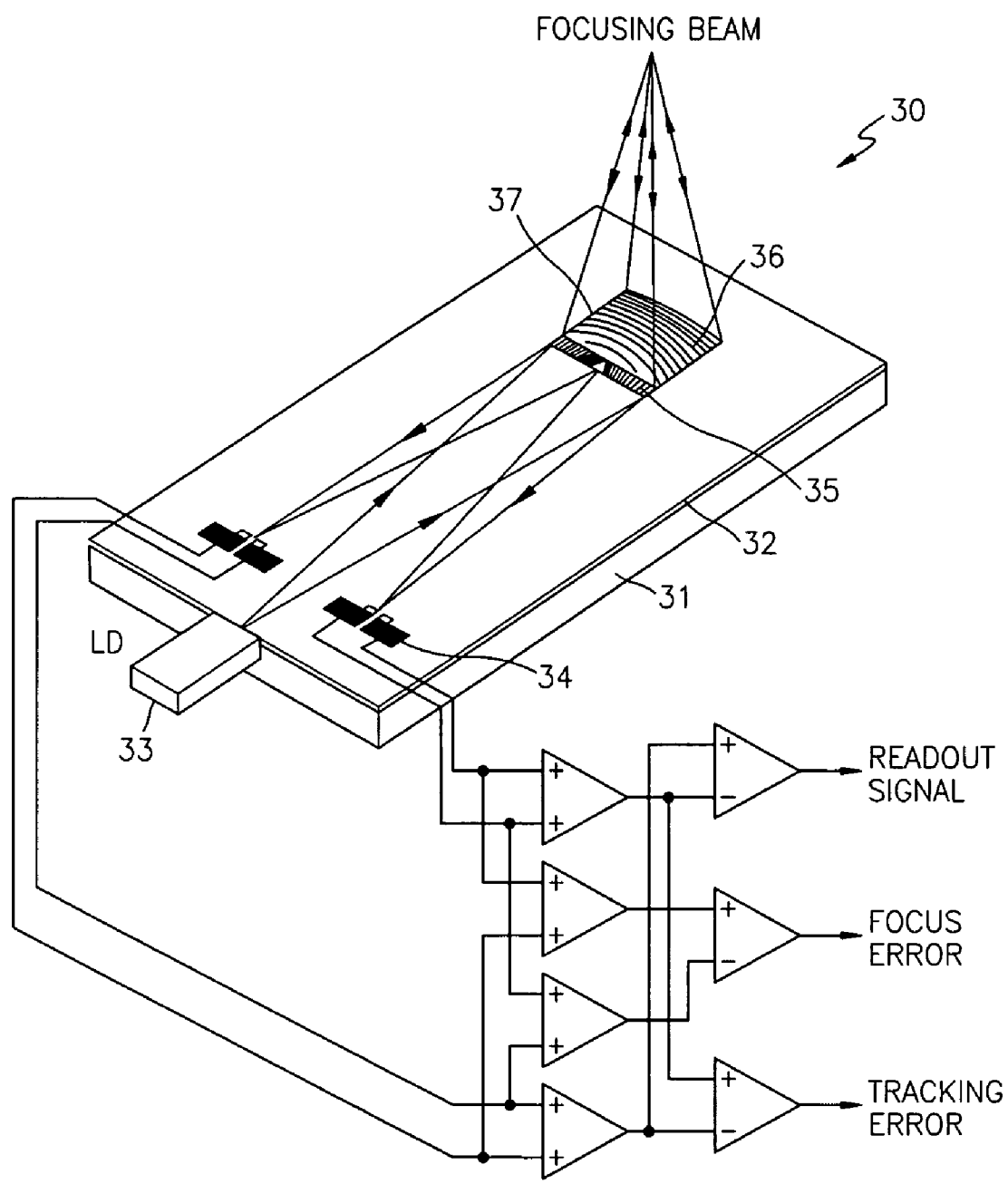
FIG. 2 is a perspective view illustrating a conventional optical pickup head for a CD/CDR/CDRW, in which a focusing grating is carved on a planar waveguide.
Figure 3A:
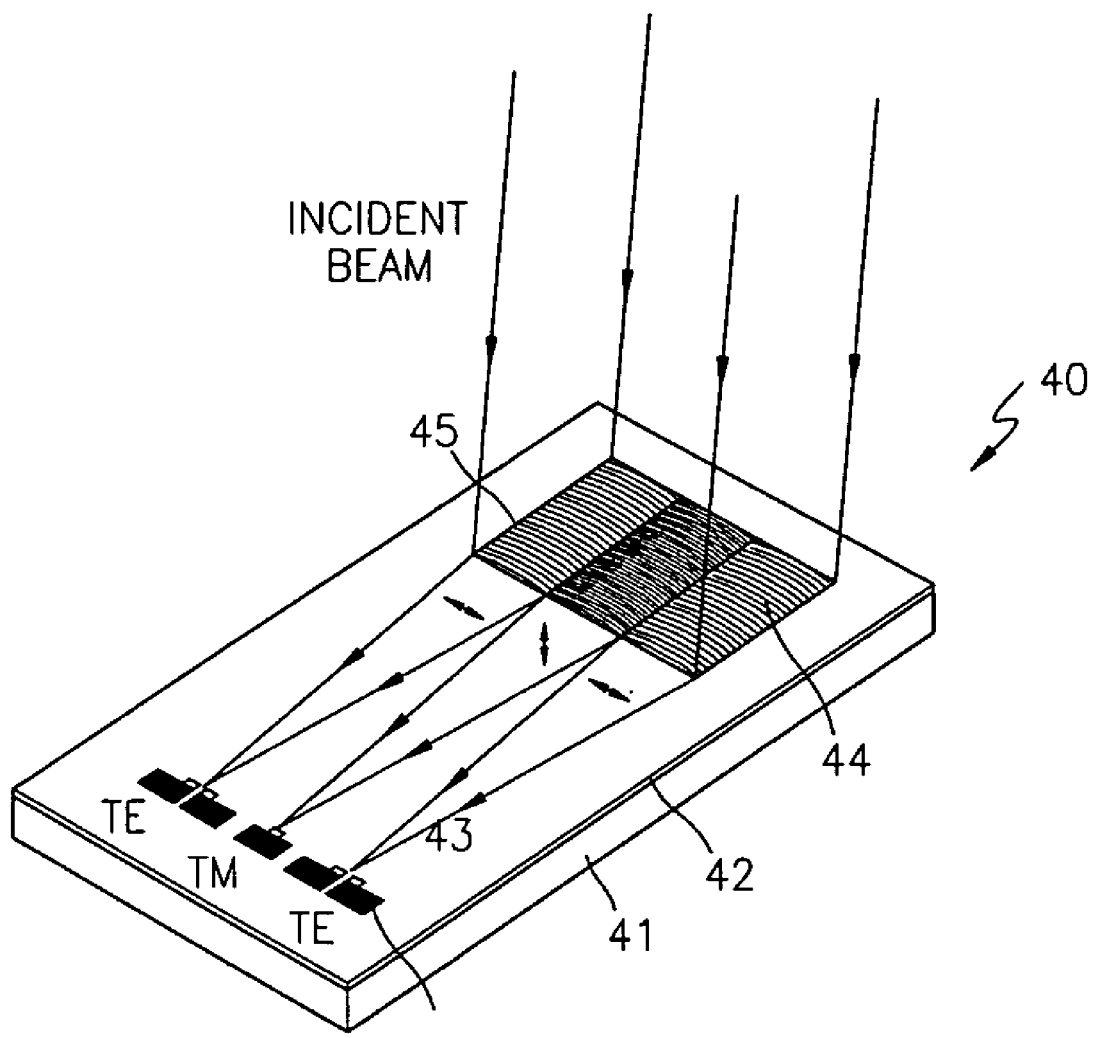
FIG. 3A is a perspective view illustrating a conventional planar waveguide-type polarization detection module.
Figure 3B:
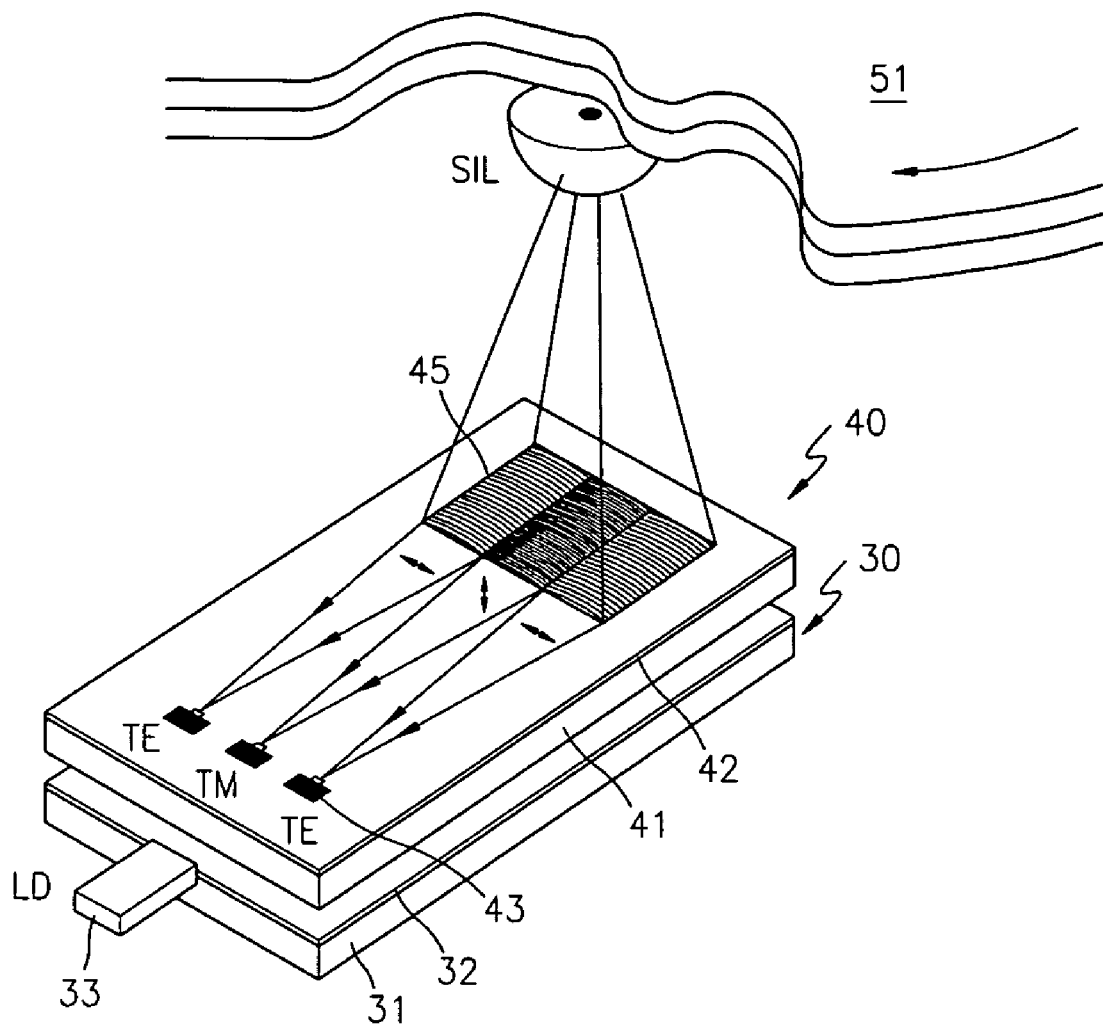
FIG. 3B is a perspective view illustrating a magneto-optical pickup head including the polarization detection module of FIG. 3A.

The present invention will now be described more fully with reference to the accompanying drawings in which exemplary embodiments of the invention are shown. This invention may, however, be embodied in many different forms and should not be construed as being limited to the embodiments set forth herein. Rather, these embodiments are provided so that this disclosure will be thorough and complete and will fully convey the scope of the invention to those skilled in the art. In the drawings, the forms of elements are exaggerated for clarity, and the same reference numerals represent the same elements.

Electrons on the surface of a metal collectively vibrate in a normal direction to the surface of the metal, and this phenomenon is called a surface plasmon wave. Quantized electrons that vibrate in such manner are called surface plasmons or surface plasmon polaritons.

A typical planar waveguide has two different modes, i.e., a TE mode and a TM mode, which orthogonally cross each other. Therefore, polarization can be split by spatially guiding the TE mode and the TM mode to two different places. Resonance of surface plasmons is very sensitive to polarization characteristics (orientation of light polarization) of light. In other words, plasmon mode coupling is characterized by the fact that a plasmon mode is not coupled to a latitudinal TE wave or the TE mode but coupled to a longitudinal TM wave or the TM mode. The present invention provides a plasmon mode directional coupler and a polarization detection module, which can spatially separate the TE and TM modes from each other by taking advantage of the characteristics of the plasmon mode coupling. More specifically, leaky plasmon mode coupling is adopted in the present invention.

Figure 4:
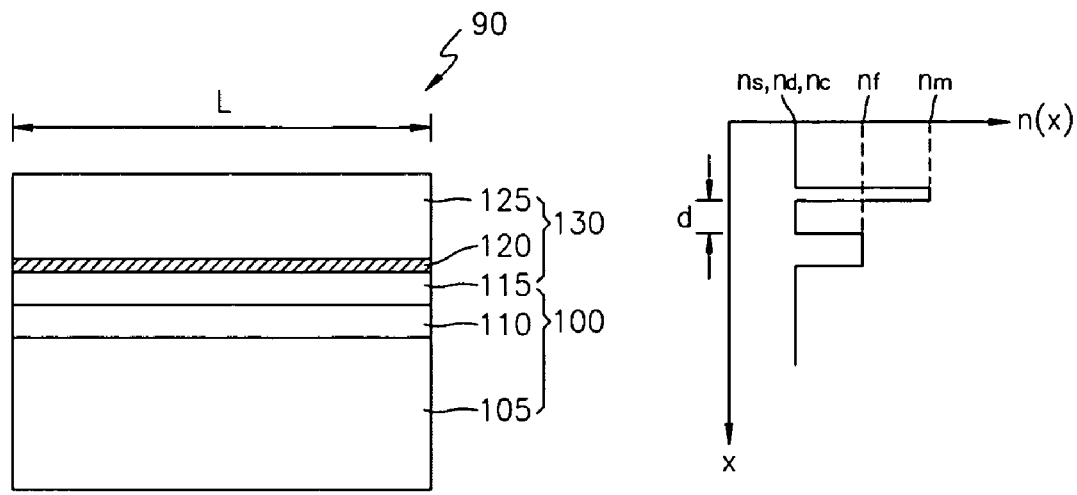
FIG. 4 is a cross-sectional view illustrating a leaky surface plasmon mode directional coupler according to a preferred embodiment of the present invention.

FIG. 4 is a cross-sectional view of a leaky plasmon mode directional coupler 90 according to a preferred embodiment of the present invention, taken along a direction in which modes proceed. Referring to FIG. 4, a core layer 110 having a refractive index $n_f$ is formed on a substrate 105 having a refractive index $n_s$, and a dielectric middle layer 115 having a refractive index $n_d$ is formed on the core layer 110 to have a thickness of d. Here, $n_s$ is not larger than $n_f$, and $n_d$ is not larger than $n_f$. The dielectric middle layer 115 is coated with a metal film 120 so as to generate surface plasmons. An absolute value of a refractive index $n_m$ of the metal film 120 is larger than the refractive index $n_f$ of the core layer 110. A dielectric cover layer 125 having a refractive index $n_c$ is thickly formed on the metal film 120. The dielectric cover layer 125 has almost the same refractive index as the dielectric middle layer 115. In short, as illustrated in the right portion of FIG. 4, $n_d$, $n_s$, $n_c < n_f < |n_m|$.

A multilayered film consisting of the dielectric middle layer 115, the metal film 120, and the dielectric cover layer 125 constitutes a plasmon mode waveguide 130, and a multilayered film consisting of the substrate 105, the core layer 110, and the dielectric middle layer 115 constitutes a planar waveguide 100, which supports TE and TM modes. In other words, the dielectric middle layer 115 contributes to both the planar waveguide 100 as an upper cladding layer for the core layer 110 and the plasmon mode waveguide 130 as a lower cladding layer for the metal film 120. The dielectric middle layer 115 and the dielectric cover layer 125 may be formed of metal oxide or fluoride. The metal film 120 may be formed of gold or silver. As descried above, a plasmon mode is not coupled to the TE mode but coupled to the TM mode. Therefore, it is possible to spatially separate the TE mode from the TM mode by taking advantage of the characteristics of the plasmon mode coupling. In addition, the plasmon mode directional coupler 90 can be used as a polarization beam splitter. The plasmon mode directional coupler 90 is an asymmetric leaky plasmon mode directional coupler.

Coupling of a plasmon mode and a TM mode can be described based on a coupled-mode theory. In general, a directional coupler is manufactured so that two independent waveguides are located very close to each other. Therefore, modes existing in the waveguides share their electromagnetic fields with each other and periodically exchange their optical powers and amounts of light while proceeding along their respective waveguides. For example, assuming that there is a directional coupler formed of a combination of two waveguides having the same refractive index and the two waveguides have modes A and B, respectively, optical powers A(z) and B(z) of the modes A and B, respectively, can be expressed using Equation (1):

$$A(z) = [a_1 e^{jkz} + a_2 e^{-jkz}]$$

$$B(z) = [b_1 e^{jkz} + b_2 e^{-jkz}] \quad (1)$$

where k represents a coupling coefficient, $a_1$ and $b_1$ represent modal amplitudes of the modes A and B when the modes A and B proceed in a positive direction, respectively, and $a_2$ and $b_2$ represent modal amplitudes of the modes A and B, respectively, when the modes A and B proceed in a negative direction. Supposing that there is no loss of light between the modes A and B, a propagation constant β, which is obtained by multiplying $$\frac{2\pi}{\lambda}$$

by an effective refractive index, is a real number, and the modes A and B satisfy Equation (2) below.

$$\frac{dA}{dz} = -jkB - j\beta A \quad (2)$$

$$\frac{dB}{dz} = -jkA - j\beta B$$

As shown in Equations (1) and (2), the modes A and B periodically exchange their optical powers as they proceed in a z direction. The righthand first term of Equation (2), in particular, shows that the modes A and B exchange optical powers of the same proportion while proceeding in the z direction. Solutions of Equations (1) and (2) can be expressed by Equation (3) below.

$$P_a(z) = \frac{|A(z)|^2}{|A_0|^2} = 1 - \sin^2(kz) \quad (3)$$

$$P_b(z) = \frac{|B(z)|^2}{|A_0|^2} = \sin^2(kz)$$

Figure 5:
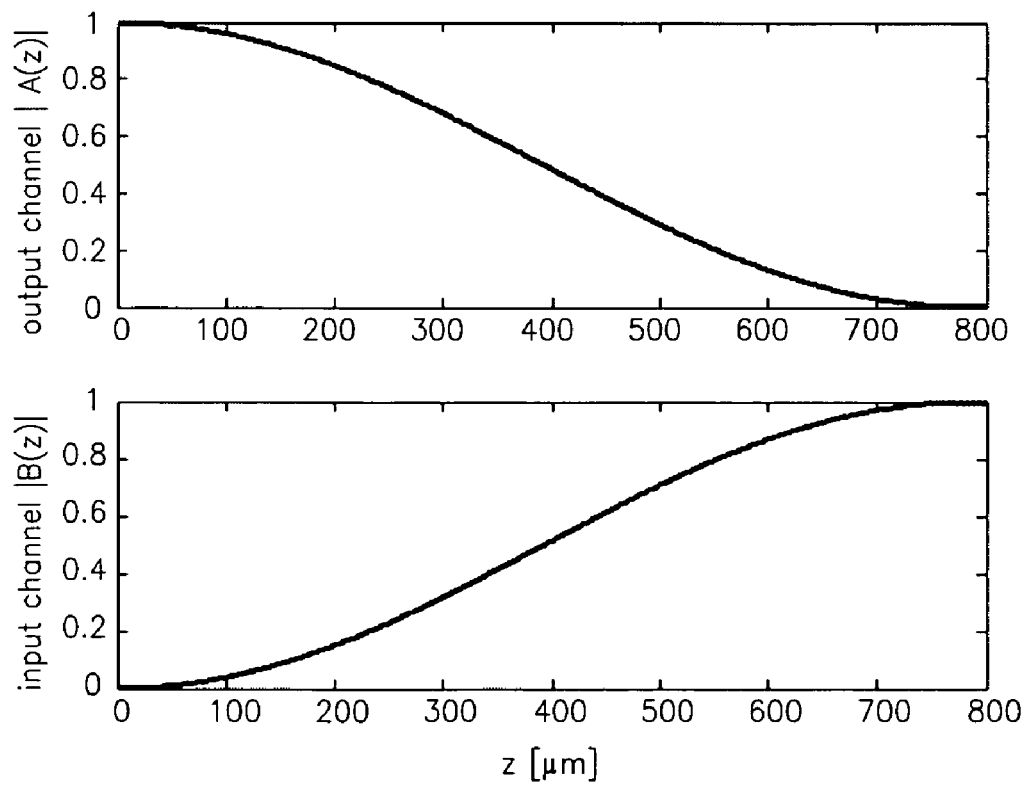
FIG. 5 is a diagram illustrating optical power variations in a longitudinal direction of a typical directional coupler and optical power exchange characteristics of the typical directional coupler.

FIG. 5 illustrates optical power variations according to the length of a coupler in a case where the modes A and B exchange optical powers, as shown in Equation (3), while proceeding in the z direction.

Even though two waveguides are not symmetric, they can completely exchange their optical powers at intervals of a predetermined amount of time as long as they have the same propagation constant β. This type of coupling is called synchronous directional coupling. Since it is assumed that there is no loss of light between the two waveguides, a coupling length $$L_c \left( = \frac{\pi}{2k} \right),$$

with which the two waveguides completely exchange their optical powers, is determined solely depending on the coupling coefficient k. However, if there is a loss of light between the two waveguides, the optical powers of the two waveguides cannot be preserved, and thus the coupling length $L_c$ is hardly determined solely based on the coupling coefficient k. In other words, the propagation constant β is a complex number. Therefore, the equations for calculating optical powers exchanged between the two waveguides should be appropriately modified by reflecting a loss of light and the coupling coefficient k.

Referring to FIG. 4, the plasmon mode directional coupler 90 couples a leaky plasmon mode of the plasmon mode waveguide 130 and a TM mode of the planar waveguide 100. Preferably, a propagation constant for the leaky plasmon mode and a real number portion of a propagation constant for the TM mode are set to be the same so that the leaky plasmon mode and the TM mode can exchange as much optical power as possible.

Figure 6:
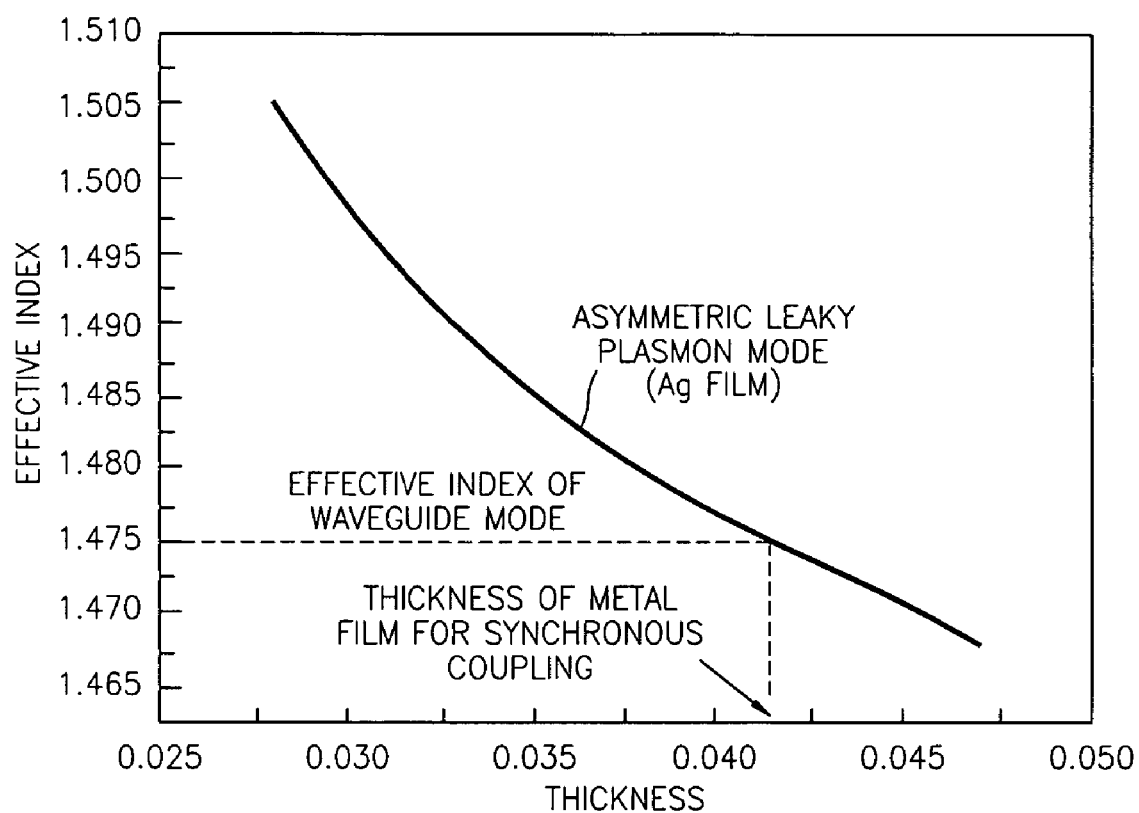
FIG. 6 is a diagram illustrating effective refractive index variations according to the thickness of a metal film of a leaky plasmon mode waveguide.

FIG. 6 illustrates the variation of effective refractive indices of a leaky plasmon mode and a TM mode according to the thickness of the metal layer 120 in order to present an example of a method for designing the plasmon mode waveguide 130 and the planar waveguide 100 to have the same propagation constant. Referring to FIG. 6, a dotted line represents the variation of the effective refractive index of the TM mode. The TM mode is determined independently of the thickness of the metal layer 120. On the other hand, the effective refractive index of the leaky plasmon mode varies according to the thickness of the metal film 120. Therefore, the effective refractive index of the leaky plasmon mode is adjusted to be the same as that of the TM mode by varying the thickness of the metal film 120, increasing the refractive index of the dielectric cover layer 125, or decreasing the refractive index of the dielectric middle layer 115. The effective refractive index of the leaky plasmon mode is higher than that of a non-leaky plasmon mode or that of the TM mode, and thus coupling of the leaky plasmon mode rarely occurs. Therefore, the effective refractive index of the leaky plasmon mode can be reduced and desirable conditions for a more efficient coupling can be attained by increasing the refractive index of the dielectric cover layer 125 and decreasing the refractive index of the dielectric middle layer 115.

At an early stage of coupling, the TM mode proceeds without any loss of light. When the TM mode encounters the leaky plasmon mode directional coupler 90, the TM mode begins to transfer its optical power to the leaky plasmon mode. The leaky plasmon mode slightly leaks light toward the dielectric cover layer 125. In other words, the leaky plasmon mode leaks some of the optical power given from the planar waveguide 100 toward the dielectric cover layer 125. As time goes by, the TM mode transfers more of its optical power to the leaky plasmon mode. Then, the leaky plasmon mode leaks all the optical power given from the TM mode toward the dielectric cover layer 125 with a loss of optical power, while proceeding. Therefore, all the optical power of the TM mode is absorbed into the dielectric cover layer 125. The TE mode, unlike the TM mode, does not exchange optical power with the leaky plasmon mode because of the characteristics of a plasmon mode.

Figure 7:
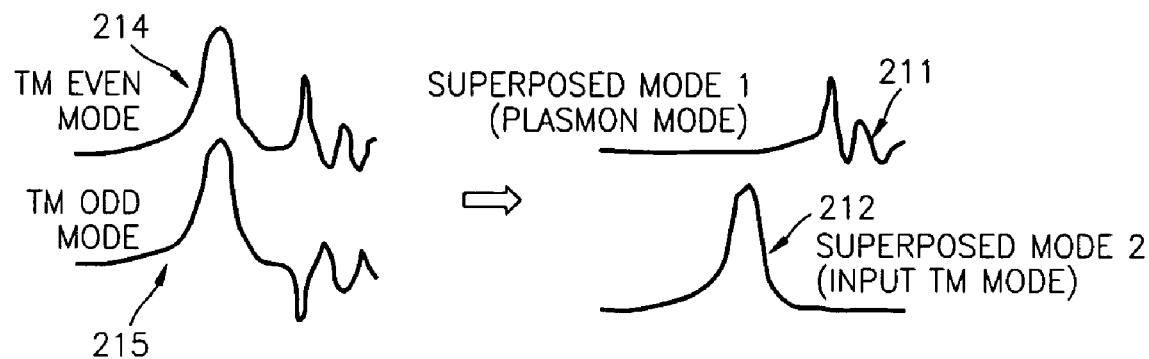
FIG. 7 is a diagram illustrating a plasmon mode and an input TM mode obtained by superposing a TM even mode and a TM odd mode.

The two waveguides 100 and 130 of the leaky plasmon mode directional coupler 90 share the dielectric middle layer 115 with each other. Therefore, the leaky plasmon mode and the TM mode can share their magnetic and electric fields and can exchange as much optical power as possible when their propagation constants in the z direction are the same. FIG. 7 illustrates the distributions of field intensities of the leaky plasmon mode and the TM mode in a direction of the X-axis. More specifically, FIG. 7 illustrates superposed modes 1 (211) and 2 (212). The superposed modes 1 (211) and 2 (212) correspond to the leaky plasmon mode and the TM mode, respectively. The superposed mode 1 (211) is asymmetric with respect to its peak. The electric field intensity of the superposed mode 1 (211) exponentially decays in the left portion of the superposed mode 1 (211) from the peak, which shows an evanescent wave, such as a near field. The electric field intensity of the superposed mode 1 (211) fluctuates taking the form of a sine function curve in the right portion of the superposed mode 1, which corresponds to the plasmon mode waveguide 130. Therefore, optical power does not propagate or leak to the planar waveguide 100 but propagates to the plasmon mode waveguide 130. Coupling of the superposed modes 1 (211) and 2 (212), i.e., coupling of the plasmon mode and the input TM mode, can be expressed by Equation (4):

$$-i\frac{da_1}{dz} = (\beta_1 + i\alpha_1)a_1 + ka_2 \qquad (4)$$
$$-i\frac{da_2}{dz} = \beta_2 a_2 + ka_1$$

where $\beta_1 + i\alpha_1$ represents a propagation constant for the leaky plasmon mode, which is a complex number, $\beta_2$ represents a propagation constant for the TM mode, $a_1$ and $a_2$ represent amplitudes of the leaky plasmon mode and the TM mode, respectively, and k represents a linear coupling coefficient between the leaky plasmon mode and the TM mode. Since the propagation constant for the leaky plasmon mode is a complex number, a loss of light occurs. In order to completely transfer optical power from the core layer 110 to the metal film 120 through a perfect coupling of the leaky plasmon mode and the TM mode, the coupling length $L_c$ should be longer than a typical lossless coupling length $$\frac{\pi}{2k}.$$

An optimal coupling length L of FIG. 4 or the optimal coupling coefficient k can be obtained using Equation (4). In calculating the optimal coupling length L or the optimal coupling coefficient k, a real number portion of the propagation constant for the superposed mode 1 (211), i.e., the leaky plasmon mode, is set to be equal to the propagation constant for the superposed mode 2 (212), i.e., the TM mode, so that $\beta_1 = \beta_2$. By doing so, a coupling efficiency of 100% can be achieved. In order to determine parameters for the leaky plasmon mode and the TM mode according to the propagation constants for the leaky plasmon mode and the TM mode and the optimal coupling coefficient k, solutions of the leaky plasmon mode and the TM mode are obtained using a transfer matrix for an electric field of a film, which is taught by E. Anemogiannis et al., J. Lightware Technol. Vol. 17, No. 5, pp. 929~941, 1999. The solutions are given in terms of the TM even mode 214 and the TM odd mode 215, as shown in FIG. 7. More specifically, the coupling coefficient k is obtained from different propagation constants for the TM even mode 214 and the TM odd mode 215. Then, the superposed modes 1 (211) and 2 (212) are obtained by superposing the TM even mode 214 and the TM odd mode 215. In otherwords, the superposed mode 1 (211) is obtained by negative-superposing the TM even mode 214 and the TM odd mode 215, and the superposed mode 2 (212) is obtained by positive-superposing the TM even mode 214 and the TM odd mode 215.

Figure 8:
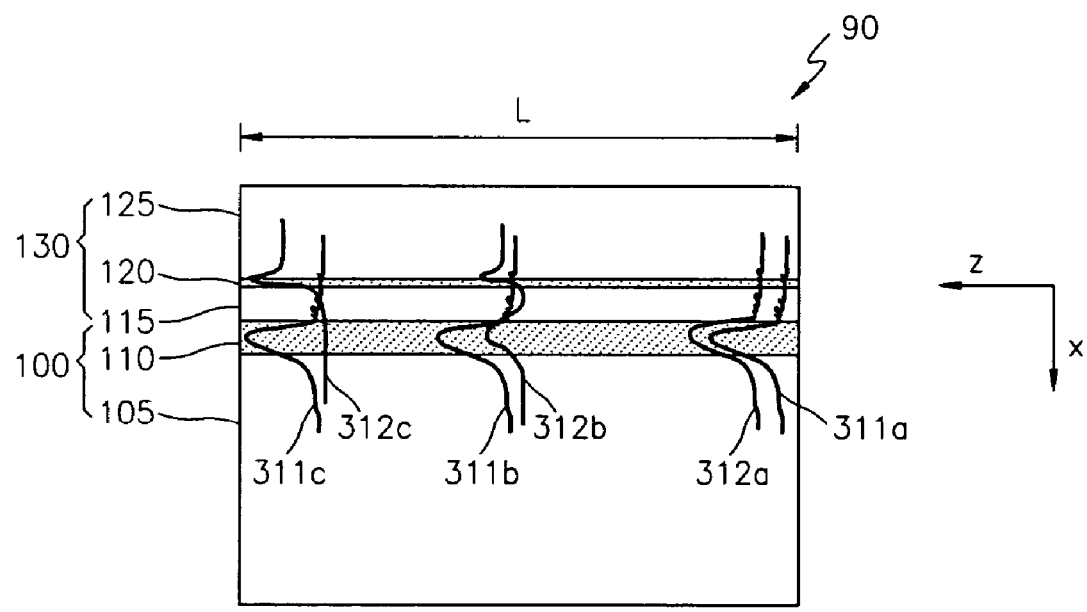
FIG. 8 is a diagram illustrating the variation of TM and TE modes when the TM and TE modes enter the asymmetric leaky plasmon mode directional coupler of FIG. 4 from the right to the left.

FIG. 8 illustrates the variation of optical powers of the TM and TE modes when the TM and TE modes enter the leaky plasmon mode directional coupler 90 of FIG. 4 from the right to the left. While the TE mode proceeds, a pattern of the distribution of optical powers of the TE mode does not change. Therefore, optical powers 311a, 311b, and 311c that the TE mode has at an input port, a middle portion, and an output port, respectively, of the leaky plasmon mode directional coupler 90 have the same distribution pattern. On the other hand, the optical power of the TM mode propagates to the leaky plasmon mode when the TM mode is coupled to the leaky plasmon mode. Therefore, optical power 312b of the TM mode at the middle portion, i.e., optical power of the TM mode when the TM mode is coupled to the leaky plasmon mode, is proportionately distributed between the planar waveguide 100 and the leaky plasmon mode waveguide 130. An optical power 312a of the TM mode at the input port has almost the same distribution pattern as the optical power 311a of the TE mode at the input port. When the TM mode arrives at the output port of the leaky plasmon mode directional coupler 90, the TM mode practically has no optical power (312a) left because most of the optical power of the TM mode has been transferred to the leaky plasmon mode. Thus, in the planar waveguide 100, only the TE mode remains. Therefore, the TM and TE modes, which orthogonally cross each other, are concentrated on different films, i.e., the metal film 120 and the core layer 110, respectively. As illustrated in FIG. 7, the optical power 312a at the input port of the leaky plasmon mode directional coupler 90 resembles the superposed mode 2 (212), and the optical power 312c at the output port of the leaky plasmon mode directional coupler 90 resembles the superposed mode 1 (211).

As described above, the leaky plasmon mode directional coupler 90 can effectively split polarizations, which orthogonally cross each other, without using a grating structure. In addition, the leaky plasmon mode directional coupler 90 can be monolithically integrated into one body with other elements because the leaky plasmon mode directional coupler 90 itself is a waveguide. In other words, all necessary elements of, for example, a detection module can be monolithically into one body on a substrate, and thus additional connection modules are not necessary. Therefore, it is possible to make a polarization detection module lighter and even more compact-sized and considerably reduce the manufacturing costs.

Figure 9:
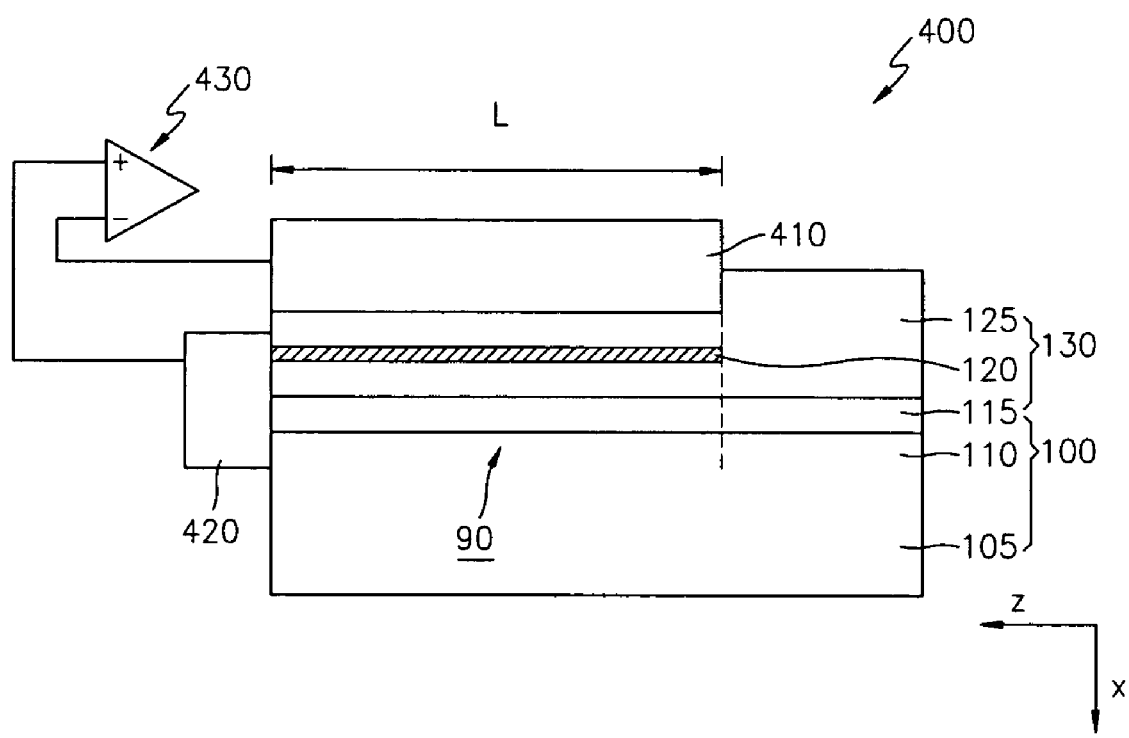
FIG. 9 is a cross-sectional view illustrating a polarization detection module for a magneto-optical pickup head, which uses a leaky plasmon mode directional coupler according to a preferred embodiment of the present invention.
Figure 10:
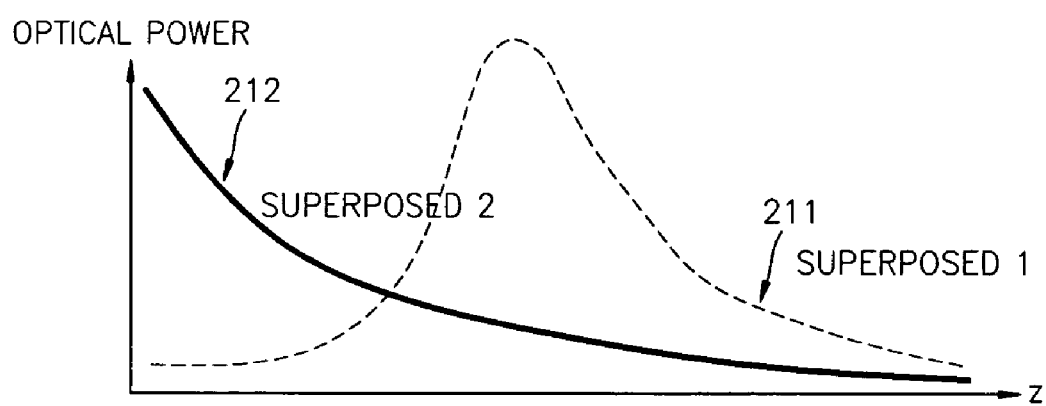
FIG. 10 is diagram illustrating extinction and generation of a plasmon mode and an input TM mode in the module of FIG. 9.

FIG. 9 is a cross-sectional view illustrating a polarization detection module 400 that can measure optical powers of two different modes, which can be physically separated from each other, by using the leaky plasmon mode directional coupler 90 of FIG. 4, and FIG. 10 illustrates extinctions and generations of the superposed modes 1 (211) and 2 (212) of FIG. 7, i.e., the plasmon mode and the TM mode.

Referring to FIG. 9, the leaky plasmon mode directional coupler 90 has the same structure as the one illustrated in FIG. 4 except that the leaky plasmon mode directional coupler 90 of FIG. 9 is connected to a first photo diode 410 so that it can detect the amount of light leaking to the dielectric cover layer 125 from the leaky plasmon mode. Therefore, the amount of light emitted from the leaky plasmon mode is detected by the first diode 410. As shown in FIG. 10, the optical power of the superposed mode 1 (211), i.e., the leaky plasmon mode, completely disappears at an end of the leaky plasmon mode directional coupler 90. Since only the TE mode can pass through the leaky plasmon mode directional coupler 90, only the superposed mode 2 (212), i.e., the TE mode, is detected at the end of the leaky plasmon mode directional coupler 90. The TE mode is detected by a second photo diode 420 located at a sidewall of the leaky plasmon mode directional coupler 90. The amounts of light respectively detected by the first and second diodes 410 and 420 are transmitted to an amplification circuit 430, thus reading data recorded on a magneto-optic disk.

As described above, the leaky plasmon mode directional coupler 90 can be monolithically integrated into one body with other elements because the leaky plasmon mode directional coupler 90 itself is a waveguide. Therefore, it is possible to manufacture an ultra-slim, ultra-small magneto-optical pickup head by integrating the leaky plasmon mode directional coupler 90 and a focusing waveguide grating coupler (FWGC), which is a planar waveguide-type pickup head, into one body. Focusing beams, generated by such magneto-optical pickup head, do not distort optical power or optical aberration. In addition, it is possible to completely split polarizations by taking advantage of the characteristics of plasmon mode coupling that a plasmon mode is coupled only to a TM mode. Therefore, it is possible to effectively split polarizations and considerably enhance a polarization extinction ratio.

In the present invention, two polarizations, which orthogonally cross each other, are split and detected using a leaky plasmon mode directional coupler.

Since the leaky plasmon mode directional coupler itself is a waveguide, it can be monolithically integrated into one body with other elements. In other words, since the leaky plasmon mode directional coupler can be integrated into one body with other elements on a substrate, additional connection modules for passively aligning or connecting elements are not necessary. Therefore, it is possible to make a polarization detection module lighter and even more compact-sized and considerably reduce the manufacturing costs.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A planar waveguide-type leaky plasmon mode directional coupler, comprising:
    a planar waveguide, which comprises a substrate, a core layer, and a cladding layer that are sequentially stacked, the planar waveguide propagating a TM mode and a TE mode between an input port and an output port; and
    a leaky plasmon mode waveguide, which comprises a lower cladding layer, a metal film, which is stacked on the lower cladding layer and generates a leaky plasmon mode to exchange energy with the TM mode only, and an upper cladding layer,
    wherein the lower cladding layer is the cladding layer of the planar waveguide.

2. The planar waveguide-type leaky plasmon mode directional coupler of claim 1, wherein the TE mode and the TM mode are spatially separated from each other and output to the output port of the core layer and the upper cladding layer, respectively.

3. The planar waveguide-type leaky plasmon mode directional coupler of claim 1, wherein a propagation constant of the TM mode is the same as a propagation constant of the leaky plasmon mode.

4. The planar waveguide-type leaky plasmon mode directional coupler of claim 1, wherein an effective refractive index of the core layer is the same as an effective refractive index of the metal film.

5. The planar waveguide-type leaky plasmon mode directional coupler of claim 1, wherein a refractive index of the cladding layer is not higher than a refractive index of the core layer, and a refractive index of the upper cladding layer is not lower than a refractive index of the cladding layer.

6. The planar waveguide-type leaky plasmon mode directional coupler of claim 1, wherein optical power of the leaky plasmon mode propagates to the upper cladding layer.

7. A polarization detection module, comprising:
    a planar waveguide, which comprises a substrate, a core layer, and a cladding layer that are sequentially stacked, the planar waveguide propagating a TM mode and a TE mode between an input port and an output port;
    a leaky plasmon mode waveguide, which comprises a lower cladding layer, a metal film, which is stacked on the lower cladding layer and generates a leaky plasmon mode to exchange energy with the TM mode only, and an upper cladding layer, the lower cladding layer being the cladding layer of the planar waveguide;
    a first photo diode, which is located on a leaky plasmon mode directional coupler that comprises the planar waveguide and the leaky plasmon mode waveguide; and
    a second photo diode, which is located at the output port of the core layer,
    wherein a polarization angle is measured based on a difference between optical powers of the first and second photo diodes.

8. The polarization detection module of claim 7, wherein the first photo diode detects optical power of the TM mode, and the second photo diode detects optical power of the TE mode.

9. The polarization detection module of claim 7, wherein a propagation constant of the TM mode is the same as a propagation constant of the leaky plasmon mode.

10. The polarization detection module of claim 7, wherein an effective refractive index of the core layer is the same as an effective refractive index of the metal film.

11. The polarization detection module of claim 7, wherein a refractive index of the cladding layer is not higher than a refractive index of the core layer, and a refractive index of the upper cladding layer is not lower than a refractive index of the cladding layer.

* * * * *